(12) United States Patent
Yung

(10) Patent No.: US 7,258,543 B2
(45) Date of Patent: Aug. 21, 2007

(54) VERTICAL MICRO-INJECTION MACHINE

(75) Inventor: Kai Leung Yung, Kowloon (HK)

(73) Assignee: The Hong Kong Polytechnic University, Hong Kong (CN)

( * ) Notice: Subject to any disclaimer, the term of this patent is extended or adjusted under 35 U.S.C. 154(b) by 323 days.

(21) Appl. No.: 10/929,445

(22) Filed: Aug. 31, 2004

(65) Prior Publication Data

US 2006/0018992 A1    Jan. 26, 2006

(30) Foreign Application Priority Data

Jul. 20, 2004    (CN) .......................... 2004 1 0071333

(51) Int. Cl.
*B29C 45/54*    (2006.01)
(52) U.S. Cl. .................. 425/546; 425/557; 425/561
(58) Field of Classification Search ................ 425/546, 425/569, 557, 558, 559, 560, 561, 145
See application file for complete search history.

(56) References Cited

U.S. PATENT DOCUMENTS

| | | | |
|---|---|---|---|
| 3,999,923 A * | 12/1976 | Schrammel et al. ........ | 425/561 |
| 5,611,975 A * | 3/1997 | Kamiguchi et al. ......... | 425/145 |
| 6,338,840 B1 * | 1/2002 | Allan et al. ................. | 425/145 |
| 6,403,010 B1 | 6/2002 | Ganz et al. | |
| 6,461,142 B1 * | 10/2002 | Kadoriku et al. ........... | 425/558 |
| 6,805,827 B2 * | 10/2004 | Kami et al. ................. | 425/589 |
| 2002/0020943 A1 | 2/2002 | Leopold et al. | |

\* cited by examiner

*Primary Examiner*—Tim Heitbrink
(74) *Attorney, Agent, or Firm*—Rothwell, Figg, Ernst & Manbeck, PC

(57) ABSTRACT

A vertical micro-injection machine includes a plasticizing unit, in which a feeding channel is provided and a screw or a plunger for transporting the molten material is provided in the feeding channel; an injection unit adapted to receive a metered amount of molten material from the plasticizing unit; an injection mold adapted to receive the metered amount of molten material from the injection unit; at least two thrust cylinders adapted to close the injection mold before injection and open the injection mold after injected parts solidified; and the injection unit includes an injection cylinder, the injection cylinder is connected with the feeding channel of the plasticizing unit, and a vertically reciprocating plunger is provided in the injection cylinder, which can expel air above the molten material in the injection cylinder by its upward advancement and then push the molten material into the injection mold. The vertical micro-injection machine according to the invention can eliminate the need for valves, avoids air entrapment in the molten plastic, provides a very high speed injection and reduces dead zones in the injection process that trap and degrade the material quality.

11 Claims, 5 Drawing Sheets

VERTICAL MICRO-INJECTION MACHINE

FIELD OF THE INVENTION

This invention relates generally to an improvement of an injection machine and more particularly to a vertical micro-injection machine.

BACKGROUND OF THE INVENTION

It is well known that the injection molding process provides the capability to mass-produce intricate parts in a precise manner. And more and more injection machines have been used for manufacture of micro component parts.

In the prior art, a vertical injection machine consists of an injection unit mounted either with a horizontal or vertical orientation and a clamp system oriented vertically to hold the molds including an upper mold and a lower mold together under force sufficient to resist the pressure exerted by the molten material. The upper mold and the lower mold define a molding cavity therebetween when brought together by a relative vertical movement between them. The molten material can be injected into the mold. After the part cools and solidifies, the mold is opened and the part can be ejected.

Based on the known vertical injection machine, a conventional vertical micro-injection machine includes further a plasticizing unit, an injection unit and a reciprocating screw through which the molten material is fed to an injection cylinder of the injection machine. The molten material is injected by moving the screw forward to force material through a nozzle into the cooled mold cavity. After a desired volume of material in front of the screw has been injected, the axial movement of the screw is stopped. Then the mold cavity is cooled and the injected material is fixed to the desired shape of the part.

Injection molding of micro size parts requires the injection of very small volume of molten material at high precision. The known vertical micro-injection machine uses valves to shut off the molten material and use the movements of screws and/or plungers to meter the exact amount of material to be injected into the mold cavity. The design and manufacture of micro valves that would not trap molten material in a dead zone face many difficulties. Therefore, many new injection machine designs on the market are attempting to resolve these problems.

From US 2002/0020943A1 there is known that the molding machine for molding microparts includes a plasticizing portion operatively connected to an injection portion and a mold portion. A valve member is provided to open and close the connection between the plasticizing portion and the injection portion. The plasticizing portion further includes a plasticizing air cylinder which drives a plasticizing plunger within the plasticizing chamber or bore. However, since the plasticizing plunger is moved in the downward direction to compress the molten material, the air entrapment in the molten material cannot be effectively eliminated, which would influence the qualities of the micro-parts.

U.S. Pat. No. 6,403,010B1 describes a method for injecting plastic or other injectable material into an injection molding tool, which includes: transporting the molten material from a plasticizing apparatus into a dosing apparatus, which has a first fluidic connection to the plasticizing apparatus, and specifically in essentially precisely the quantity that is to be introduced into the injection molding tool; transporting the molten material, essentially in that quantity which is to be introduced into the injection molding tool, from the metering apparatus into an injection apparatus, via a second fluidic connection, while at the same time preventing the molten material from backflowing from the metering apparatus into the plasticizing apparatus; injecting the entire material, which is situated in the injection apparatus, into the injection molding tool by an injection piston, while at the same time preventing the material from flowing from the injection apparatus back into the metering apparatus. In this way, since the molten material is transported from the top down firstly and then transported horizontally to compress the molten material, the air entrapment in the molten material cannot be effectively eliminated, which would also influence the qualities of the micro-parts.

SUMMARY OF THE INVENTION

The present invention has been made in view of the above mentioned problems, and an object of the present invention is to provide a vertical micro-injection machine that eliminates the need for valves, avoids air entrapment in the molten material and provides a very high speed injection. The invention also reduces dead zones or dead corners in the injection process that trap and degrade the material quality in order to prevent degraded material from becoming the main source of contamination later.

The vertical micro-injection machine according to the invention comprising: a plasticizing unit, in which a feeding and melting channel is provided and a screw or a plunger for transporting the molten material is provided in the feeding channel; an injection unit adapted to receive a metered amount of molten material from said plasticizing unit; an injection mold adapted to receive the metered amount of molten material from the injection unit; at least two thrust cylinders adapted to close the injection mold before injection and open the injection mold after injected parts solidified; and the injection unit includes an injection cylinder, the injection cylinder is connected with the feeding channel of the plasticizing unit, and a vertically reciprocating plunger is provided in the injection cylinder, which can expel air above the molten material in the injection cylinder by its upward advancement and then push the molten material into the injection mold. The design that the injection cylinder is positioned vertically and the plunger can inject the molten material upwards can expel air above the liquid column of molten material in the injection cylinder to eliminate air entrapment before the molten material is being push into the mold.

According to the invention, it is preferred that the feeding channel and the injection cylinder form an angle.

According to the invention, it is preferred that a horizontal inlet channel is connected to the injection cylinder and the feeding channel of the plasticizing unit respectively and located therebetween.

According to the invention, it is preferred that the injection machine further comprises a pressure sensing apparatus, which is provided near to the top of the injection cylinder to measure the pressure of the molten material to be injected. During the upward advancement of the plunger the pressure profile measured by the pressure sensing apparatus is used to compute in real-time the amount of upward advancement of the plunger required to inject the precise amount of molten material into the injection mold and control the movement of the plunger accordingly in real-time. In fact, the pressure sensing mechanism through the injection process will provide an effective way of avoiding damage to the mould when some solid is blocking the mould and more importantly the signature of the pressure variations will provide an effective means of calculating and controlling the exact amount of material to be injected.

According to the invention, it is preferred that the injection machine further comprises a servo motor, which is connected with the screw or the plunger.

According to the invention, it is preferred that the injection machine further comprises a plunger actuator connected with the plunger and driven by a motor, which can be a linear servo motor.

According to the invention, it is preferred that the injection machine further comprises a pressure/temperature sensing apparatus, which is provided close to the end of the feeding channel of the plasticizing unit to measure the pressure and/or temperature of the molten material to be fed. A water jacket is provided around the plasticizing unit for heat isolation.

According to the invention, it is preferred that the injection mold are open and closed by synchronizing the motions of at least two electric thrust cylinders. The said electric thrust cylinders can be actuated independently after the closing of the injection mold in order to finally adjust the clamping force of each electric thrust cylinder to equalize clamping force at the different areas and/or sides of the injection mold.

The invention uses a simple and clean mechanism to eliminate the air entrapment problem in the injection and the need for one-way and/or shut-off valves. By using the measured pressure profile signature to control the exact amount of molten material injected, it provides the foundation for a new mechatronics approach to high speed injection and precision metering of the molten material (molten plastic) actually injected into the mold cavity in difficult situations such as very small size and non-regular shape molds etc.

The invention has immediate applications in the design of plastic injection molding machines for miniature size parts. It forms a new basis for the next generation of micro injection molding machines and provides a foundation for the use of mechatronics devices such as linear motor and servo motor for high speed injection.

BRIEF DESCRIPTION OF THE DRAWINGS

The invention will be described hereinafter in more detail with the aid of various embodiments with reference to the accompanying drawings, in which.

DETAILED DESCRIPTION OF THE INVENTION

Figure 1:
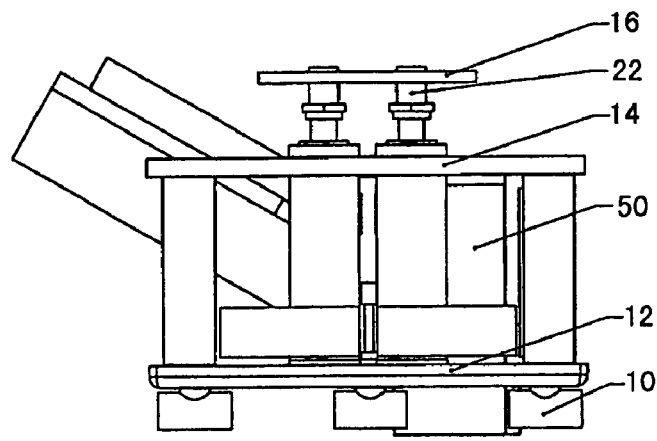
FIG. 1 is a schematic diagram of a vertical micro-injection machine without showing the hopper according to the invention.
Figure 2:
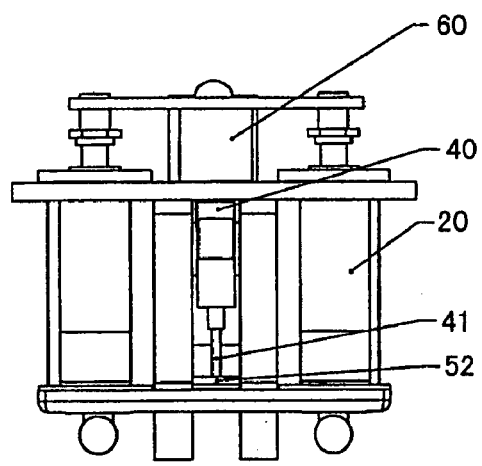
FIG. 2 is a right view of the vertical micro-injection machine shown in FIG. 1.
Figure 3:
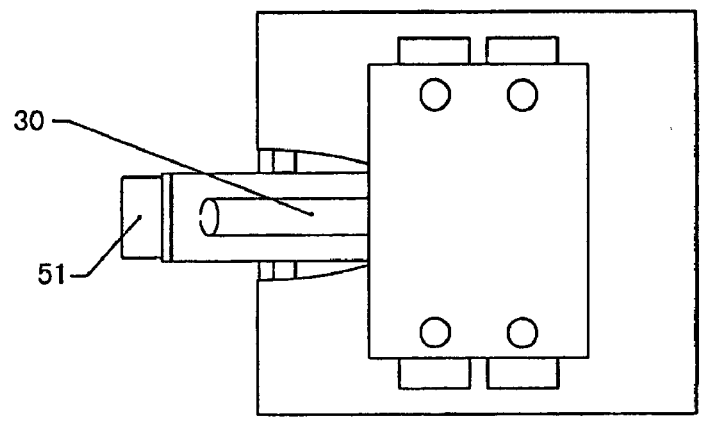
FIG. 3 is a top view of the vertical micro-injection machine according to FIG. 1.
Figure 4:
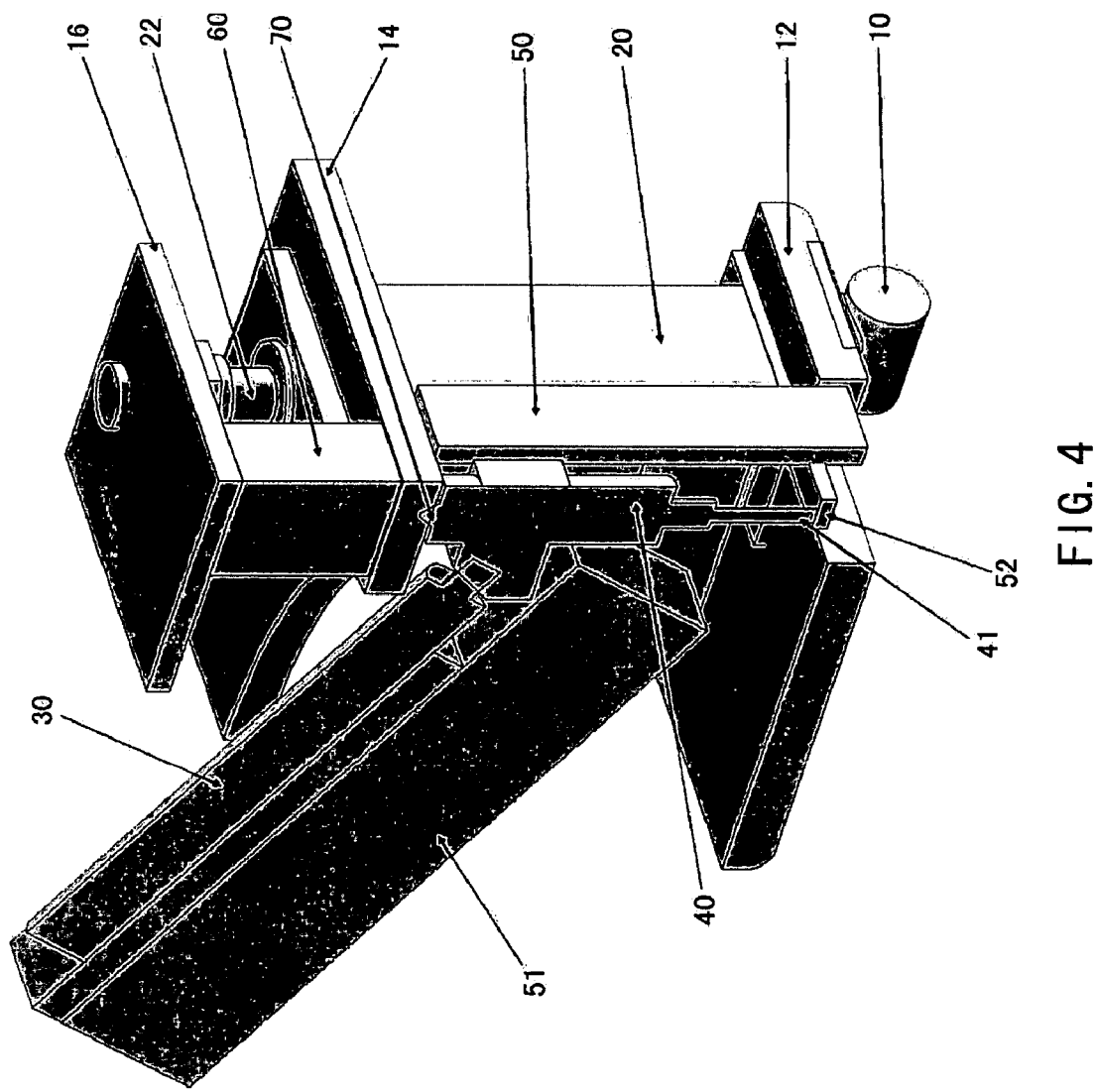
FIG. 4 is a perspective view of the vertical micro-injection machine shown in FIG. 3.

This invention will now be described in detail. Referring to the figures, FIGS. 1-4 are schematic diagrams of a vertical micro-injection machine without showing the hopper according to the invention. A vertical micro-injection machine includes a machine support 10, a base plate 12 which is fixed on the upper surface of the machine support 10, a stationary mould clamping plate 14 located over the base plate 12 and a movable mould clamping plate 16 located over the stationary mould clamping plate 14. Two or more electric thrust cylinders 20 are located symmetrically on the mould clamping plate 14 in this embodiment. The thrust cylinder rods 22 of the electric thrust cylinder 20 are connected with the movable mould clamping plate 16 through the stationary mould clamping plate 14. The thrust cylinders 20 can be electric cylinders, hydraulic cylinders or air cylinders etc.

The vertical micro-injection machine according to the invention further includes a plasticizing unit 30, an injection unit 40 and an injection mold 60 and they are all located along the central axis of the machine. The plasticizing unit 30 is adapted to soften the solid material, e.g. plastic, and control to feed molten plastic into the injection unit 40. The injection mold 60 is comprised with an upper mold (moving mold) and a lower mold (stationary mold). The upper mold and the lower mold define a molding cavity therebetween when brought together by a relative vertical movement between them. The mould clamping plates 14 and 16 hold the injection mold 60 together, and the injection mold 60 can be open and close automatically by controlling the thrust cylinder rods 22. A control system is used to control the movement of all the portions.

Figures 5, 6:
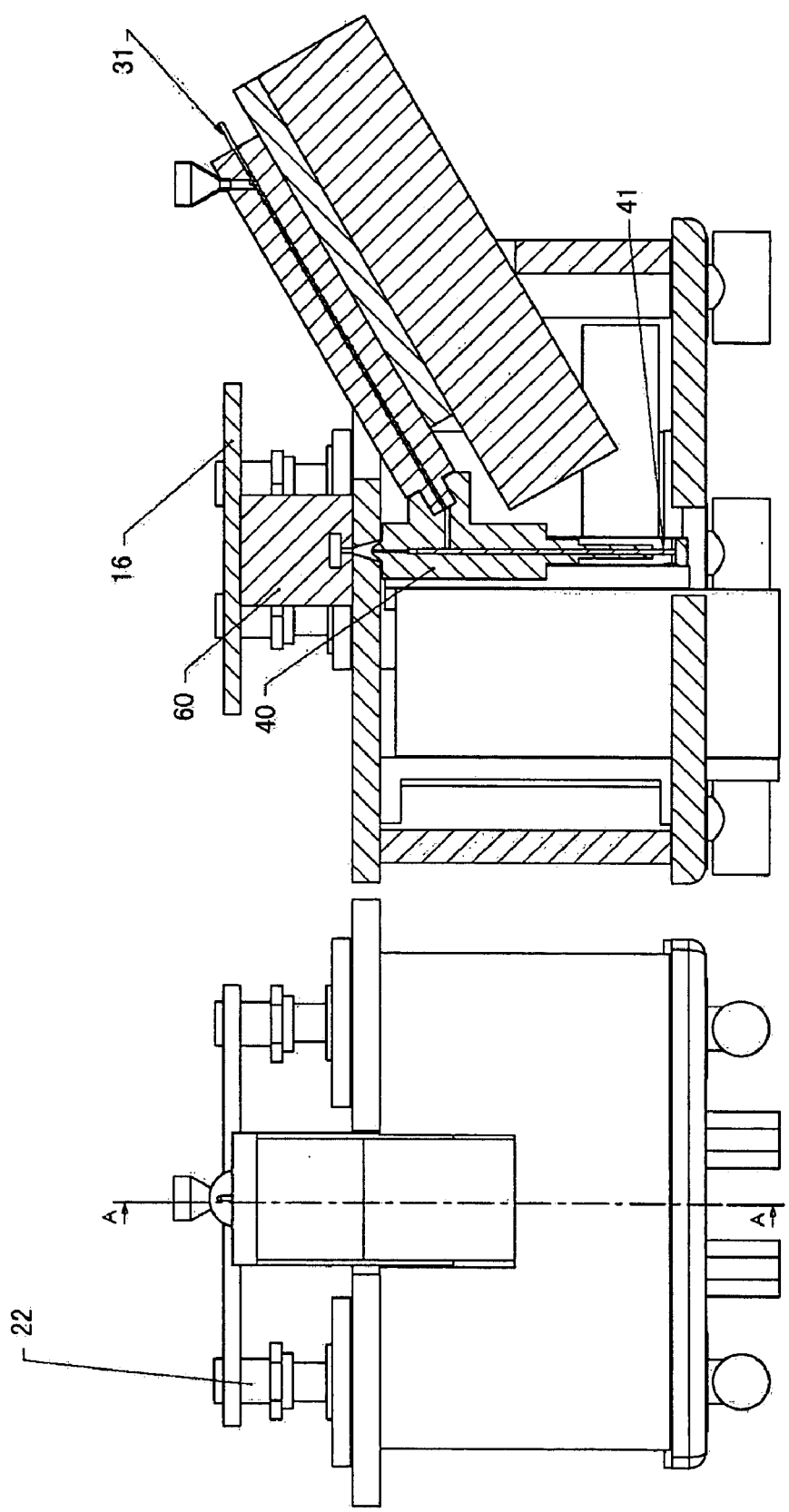
FIG. 5 is a schematic diagram of a vertical micro-injection machine with a hopper according to the invention.
FIG. 6 is a sectioned view of the vertical micro-injection machine shown in FIG. 5 taken along the central axis line A-A thereof.
Figures 7, 8:
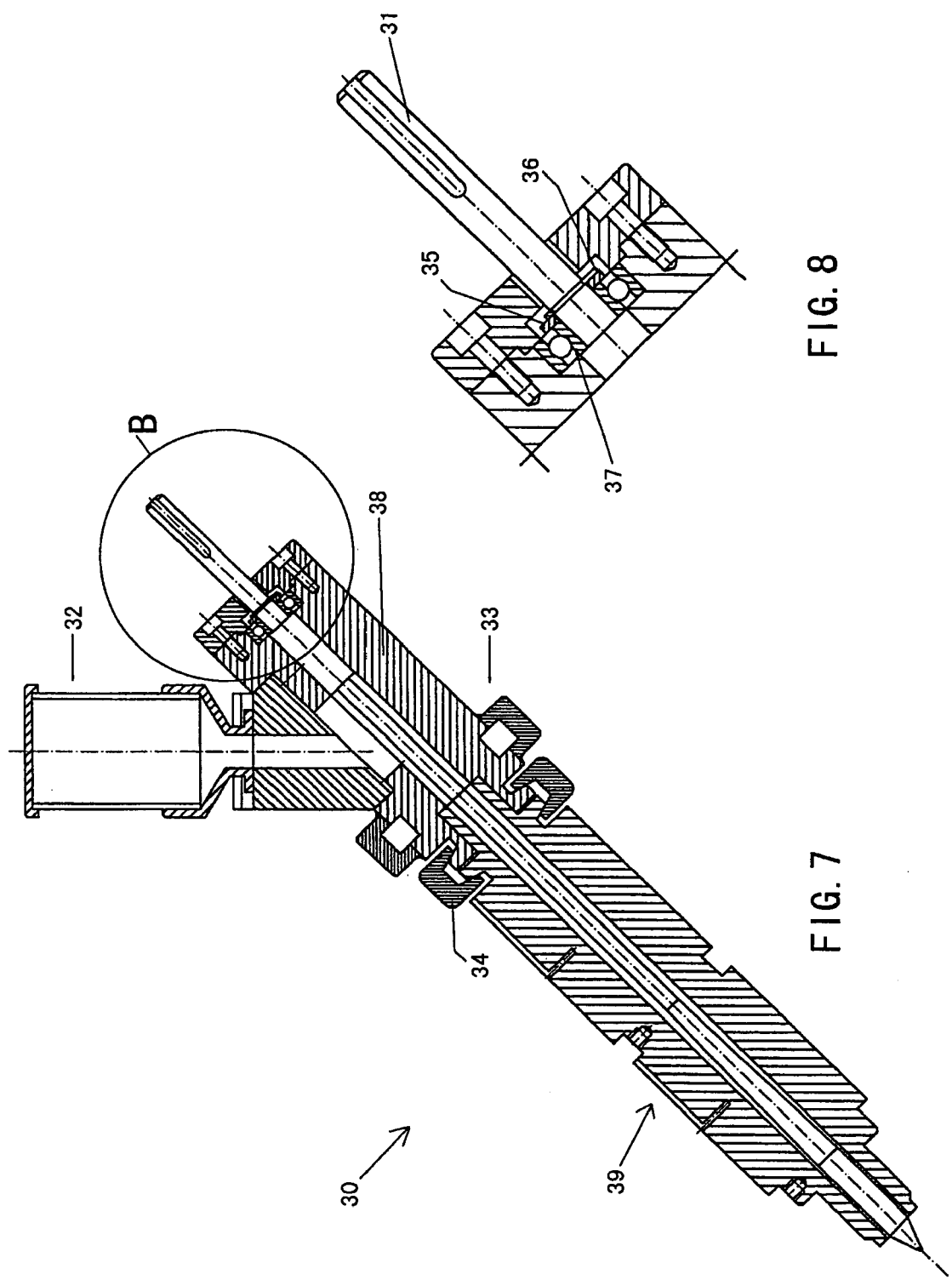
FIG. 7 is a sectioned view of a plasticizing unit of a vertical micro-injection machine according to the invention.
FIG. 8 is a an enlarged view of the part B of the plasticizing unit shown in FIG. 7.

FIGS. 5 and 6 illustrate a schematic diagram of a vertical micro-injection machine with a hopper according to the invention and FIGS. 7 and 8 illustrate a sectional view of the plasticizing unit 30 in detail. It can be seen that the plasticizing unit 30 includes an upper portion 38 and a lower portion 39. A hopper 32 is provided on the upper portion 38 of the plasticizing unit 30. In this embodiment a rotating screw 31 is inserted in the feeding channel of the plasticizing unit 30 through the upper portion 38 and the lower portion 39. And in other designs, the screw 31 can be substituted by a plunger. In addition a water jacket 33 is provided around the upper portion 38 and located on the end of the upper portion 38 close to the lower portion 39. Cold water flows in the water jacket 33 for heat isolation. A clamp 34 is provided in the connection region of the upper portion 38 and the lower portion 39 for connecting and clamping the two parts. Based on the above structure, the solid plastic in the form of granule or powder is fed from the hopper 32 into the feeding channel of the plasticizing unit 30. The plastic is heated and melted in the plasticizing unit 30, wherein the plastic could be substituted by other injectable materials for injection molding.

In the plasticizing unit 30, the screw 31 inserted in the feeding channel can rotate. The rotation of the screw is produced by a motor and acts to melt, mix, and move the molten plastic forward, so that the molten plastic can be injected through a horizontally positioned inlet channel 46. Referring to FIG. 8, the screw 31 is inserted in the feeding channel and is supported by a bearing 37 located in the upper portion 38 of the plasticizing unit 30. The bearing 37 is located on the axis shoulder by a flat washer 35 and a retaining ring 36, which can prevent the bearing 37 moving in the axial direction. A pressure/temperature sensing apparatus 81 is provided close to the end of the feeding channel to measure the pressure/ temperature of the molten plastic to be fed into an injection cylinder 42. The dynamic change in the liquid pressure is recorded by the sensing apparatus 81 and used for real-time computation of the accurate amount of molten plastic to be fed into the injection unit 40 through controlling the motion of the screw 31.

Figure 10:
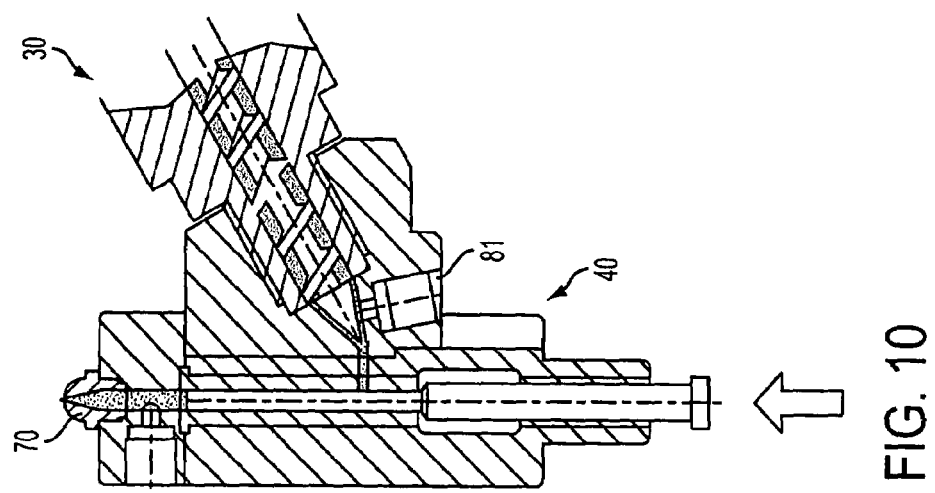
FIG. 10 is a partially sectional view of the injection portion of a vertical micro-injection machine according to the invention at the injection stage.
Figure 9:
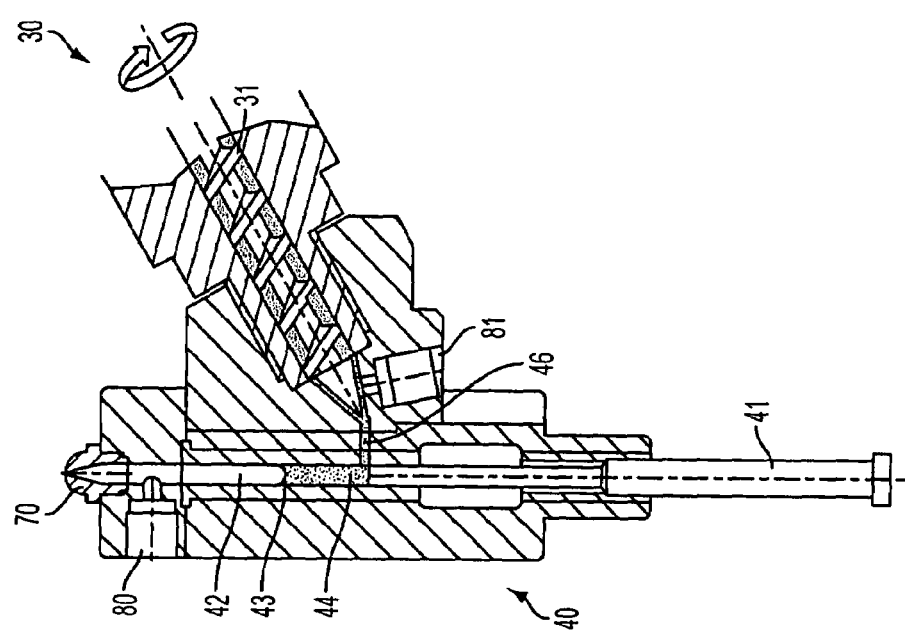
FIG. 9 is a partially sectional view of the injection portion of a vertical micro-injection machine according to the invention at the feeding stage.

As shown in FIGS. 9 and 10, it can be seen that the injection unit 40 includes an injection cylinder 42 which is connect with the feeding channel of the plasticizing unit 30 by the inlet channel 46. The injection cylinder 42 and the feeding channel form an angle. A plunger 41 is inserted in the injection cylinder 42 and can reciprocate in it, so that the feeding channel is first shut off by the plunger 41 and then metered amount of molten plastic can be pushed up in the injection cylinder 42 by the plunger 41. A nozzle 70 is provided on the top of the injection channel and is axially aligned with the injection channel. The nozzle 70 engages with a sprue of the injection mold 60 to permit injection of the molten plastic through the sprue into the injection mold 60. Depending on the mold design, the nozzle 70 can be optional.

Near to the top of the injection cylinder 42, a pressure sensing apparatus 80 is attached to measure the pressure of the molten plastic to be injected. The pressure sensing apparatus can be substituted for a pressure/temperature sensing apparatus which can also measure the temperature of the molding plastic. As the plunger 41 moves forward, the dynamic change in the liquid pressure is recorded, and used for real-time computation, by which the advancement of the plunger 41 can be stopped exactly in order to inject the precise amount of molten plastic into the injection mold 60.

The injection molding process occurs cyclically. The injection molding cycle of the vertical micro-injection machine according to the invention is divided into five stages. The first is the feeding stage, the second is the stage for shutting off the feeding channel by advancement of the plunger 41, the third is the injection stage, the fourth is the molding stage and the fifth is the removing stage.

FIG. 9 is a partially sectional view of a vertical micro-injection machine according to the invention at the feeding stage. At the feeding stage, the solid plastic is fed from the hopper 32 into the plasticizing unit 30 and melted. Then the molten plastic is fed into the injection cylinder 42 through the inlet channel 46 with the appropriate rotation of the screw 31. A plasticizing motor 51 is used for rotating the screw 31. For precision control of the melting and feeding screw, the plasticizing motor 51 can be a servo motor for rotating the screw 31. For models that require lower precision, the plasticizing motor 51 can be a stepping motor. At this time, the plunger 41 is retracted to just below the inlet channel 46. A metered amount of molten plastic is being fed into the injection cylinder 42. That is the inlet channel 46 is opened by the retraction of the plunger 41 at the feeding stage and the appropriate amount of molten plastic is fed into the injection cylinder 42 through the controlled rotation of the feeding screw 31 by the control system.

FIG. 10 is a partially sectional view of a vertical micro-injection machine according to the invention at the injection stage. After the appropriate amount of molten plastic has been fed into the injection cylinder 42, the plunger 41 starts to move upwards first closing the feeding channel. Due to gravitational force, the liquid level is maintained during the ascent of the plunger while air above the liquid is expelled first. When the liquid column 44 reaches the orifice of the nozzle 70, or the orifice of the feeder into the mold cavity in some mold design where the nozzle 70 is not required, an increase in the molten plastic pressure is registered by the pressure sensing apparatus 80. This pressure signature captured is used to calculate in real time the position where the top level of the molten plastic reaches the orifice of the nozzle 70 and when the exact amount of liquid has been injected into the mold cavity so as to stop the advancement of the plunger 41 in the precise position. In other variation of mold designs that do not require nozzle 70, the restriction (s) that has the same function of nozzle 70 to generate the pressure change is(are) incorporated inside the mold. For high acceleration, high speed and precision control of the upward injection process, a linear servo motor 50 is being used for moving the plunger 41 through a plunger actuator 52. Due to its high acceleration, the use of linear servo motor in the injection has greatly increased the injection rate and provide a much higher level of precision that are not achievable by other mechanisms. For lower acceleration variation of the design, other means such as a hydraulic or servo motor plus screw and/or cam may be used. At the injection stage this injection machine independent of shut off valve design and with real-time pressure signature analysis has eliminated the problem of air entrapment in horizontal injection machines, eliminated the dead zones in shut off valves and provided a high precision method of metering the exact amount of molten plastic being injected into the mold cavity.

After the appropriate amount of molten plastic has been injected into the injection mold 60, the molding stage is started. The molten plastic in the mold cavity is cooled and solidifies. After that, the removing stage is started, i.e. the injection mold 60 is opened by the two or more thrust cylinders 20 and injected parts can be ejected. The plunger 41 is then retracted to just below the inlet channel 46 again and the injection mold 60 is closed by said two or more thrust cylinders for the next shot. After that, the next cycle can be started. In the process, for precision control of the speed profile, force profile, etc. of the mold closing process, a servo motor plus screw arrangement (e.g. servo motor thrust cylinder) is used to actuate the mold closing process. Furthermore, the electric thrust cylinders 20 can be actuated independently after the closing of the injection mold 60 in order to finally adjust the clamping force of each electric thrust cylinder 20 to equalize clamping force at the different areas and/or sides of the injection mold 60. A special control algorithm is used to phase lock the motion of all the servo motors so as to attain equal movement on all sides of the moving mold plate. For lower cost variation of the design, other lower cost mechanism such as hydraulic cylinders may be used. The above mentioned process is controlled by the control system, which may be a computer system. The control system controls all the moving parts of the injection machine at different stages and detects each stage and feedback signals to finish the cycle. The pressure sensing mechanism through the injection process will also provide an effective way of avoiding damage to the mold when some solid is blocking the mold. For example, a sudden rise of pressure at the inappropriate place during the advancement of the plunger 41 is an indication of blockage or other problems in the mold which the controller shall take note, the control system can actuate to sound an alarm and stop the advancement of the plunger according to the feedback signal of a sensing apparatus in order to avoid damage to the mold.

As described above, it can be seen that the invention uses a simple and clean mechanism to eliminate the air entrapment problem in the injection and the need for one-way and/or shut-off valves. It provides the foundation for a new mechatronics approach to high speed injection and precision metering of the melt liquid (molten plastic) actually injected into the mold cavity in difficult situations such as very small size and non-regular shape molds etc.

The invention has been described with reference to preferred embodiments. Obviously, alterations and modifications will occur to those skilled in the art upon reading and understanding the detailed description of the invention set forth above. It is intended to include all such modifications and alterations insofar as they come within the scope of the invention.

The invention claimed is:

1. A vertical micro-injection machine for molding micro-parts comprising:
    a plasticizing unit (30), in which a feeding channel for heating and melting a material in the feeding channel is provided and a screw or a plunger (31) for transporting the molten material is provided in the feeding channel;
    an injection unit (40) adapted to receive a metered amount of the molten material from said plasticizing unit (30);
    an injection mold (60) adapted to receive the metered amount of the molten material from the injection unit (40);
    at least two thrust cylinders (20) adapted to close the injection mold (60) before injection and open the injection mold (60) after injected parts solidified;
    characterized in that the injection unit (40) includes an injection cylinder (42), the injection cylinder (42) is connected with the feeding channel of the plasticizing unit (30), and a vertically reciprocating plunger (41) is provided in the injection cylinder (42), which can expel air above the molten material in the injection cylinder (42) by its upward advancement and then push the molten material into the injection mold (60).

2. The vertical micro-injection machine according to claim 1, characterized in that the feeding channel is inclined with respect to the injection cylinder (42).

3. The vertical micro-injection machine according to claim 2, characterized in that a horizontal inlet channel (46) is connected to the injection cylinder (42) and the feeding channel of the plasticizing unit (30) respectively and located therebetween.

4. The vertical micro-injection machine according to claim 1, characterized in that a pressure sensing apparatus (80) is provided near to the top of the injection cylinder (42) for measuring the pressure of the molten material to be injected.

5. The vertical micro-injection machine according to claim 4, characterized in that the pressure sensing apparatus (80) measures the pressure profile of the molten material during the upward advancement of the plunger (41), and the pressure profile is used to compute in real-time the amount of the upward advancement of the plunger (41) for controlling the movement of the plunger (41) accordingly in real-time and injecting the precise amount of molten material into the injection mold (60).

6. The vertical micro-injection machine according to claim 1, characterized in that a servo motor is connected with the screw or the plunger (31).

7. The vertical micro-injection machine according to claim 1, characterized in that a plunger actuator (52) is connected with the plunger (41) and driven by a motor, wherein the motor is a linear servo motor.

8. The vertical micro-injection machine according to claim 1, characterized in that a pressure/temperature sensing apparatus (81) is provided close to the end of the feeding channel of the plasticizing unit (30) for measuring the pressure and/or temperature of the molten material to be fed.

9. The vertical micro-injection machine according to claim 1, characterized in that a water jacket (33) is provided around the plasticizing unit (30) for heat isolation.

10. The vertical micro-injection machine according to claim 1, characterized in that the injection mold (60) are open and closed by synchronizing the motions of at least two electric thrust cylinders (20).

11. The vertical micro-injection machine according to claim 10, characterized in that said electric thrust cylinders (20) can be actuated independently after the closing of the injection mold (60) in order to finally adjust the clamping force of each electric thrust cylinder (20) to equalize clamping force at the different areas and/or sides of the injection mold (60).

* * * * *